(12) United States Patent
Katsuragi

(10) Patent No.: US 8,724,232 B2
(45) Date of Patent: May 13, 2014

(54) ZOOM LENS AND PHOTOGRAPHING APPARATUS INCLUDING THE SAME

(75) Inventor: Daigo Katsuragi, Yokohama (JP)

(73) Assignee: Samsung Techwin Co., Ltd., Changwon (KR)

(*) Notice: Subject to any disclaimer, the term of this patent is extended or adjusted under 35 U.S.C. 154(b) by 28 days.

(21) Appl. No.: 13/285,117

(22) Filed: Oct. 31, 2011

(65) Prior Publication Data

US 2012/0105977 A1    May 3, 2012

(30) Foreign Application Priority Data

Oct. 29, 2010  (JP) ................................. 2010-243942
Sep. 22, 2011  (KR) ........................ 10-2011-0095820

(51) Int. Cl.
*G02B 15/14*  (2006.01)
*G02B 3/02*   (2006.01)
*G02B 13/18*  (2006.01)
*G02B 15/177* (2006.01)

(52) U.S. Cl.
CPC .................................. *G02B 15/177* (2013.01)
USPC ........................................ 359/691; 359/717

(58) Field of Classification Search
USPC ................ 359/676–686, 691, 689, 693–706, 359/745–753, 793
See application file for complete search history.

(56) References Cited

U.S. PATENT DOCUMENTS 5,552,937 A *  9/1996  Ono et al. ...................... 359/691
6,903,878 B2 * 6/2005  Nanba ........................... 359/680
7,738,184 B2 * 6/2010  Kashiki et al. ................ 359/684

FOREIGN PATENT DOCUMENTS

| JP | 2004-317901 A | 11/2004 |
| JP | 2005-134887 A | 5/2005 |
| JP | 2006-119574 A | 5/2006 |
| JP | 2010-008917 A | 1/2010 |
| JP | 2011-018009 A | 1/2011 |
| KR | 10-2010-0020907 A | 2/2010 |

* cited by examiner

*Primary Examiner* — Scott J Sugarman
*Assistant Examiner* — Robert E Tallman
(74) *Attorney, Agent, or Firm* — Sughrue Mion, PLLC

(57) ABSTRACT

A zoom lens and a photographing apparatus including the same are provided, where the zoom lens includes, in an order from an object side to an image side: a first lens group having a negative refractive power; and a second lens group having a positive refractive power wherein zooming is performed by varying a distance between the first lens group and the second lens group, and the first lens group is configured to move in a given direction to perform focusing and correcting a variation in an image plane caused by the zooming, during the zooming.

15 Claims, 20 Drawing Sheets

ZOOM LENS AND PHOTOGRAPHING APPARATUS INCLUDING THE SAME

CROSS-REFERENCE TO RELATED PATENT APPLICATIONS

This application claims priority from Japanese Patent Application No. 2010-243942, filed on Oct. 29, 2010, in the Japan Patent Office, and Korean Patent Application No. 10-2011-0095820, filed on Sep. 22, 2011, in the Korean Intellectual Property Office, the disclosures of which are incorporated herein in their entirety by reference.

BACKGROUND

1. Field

Apparatuses consistent with exemplary embodiments relate to a zoom lens and a photographing apparatus including the same.

2. Description of the Related Art

Surveillance cameras that may operate in the daytime and at nighttime have been recently developed. Thus, demand for zoom lenses that are suitable for surveillance cameras and used in a visible light region and a near infrared light region is increasing. In such zoom lenses for surveillance cameras, in particular, chromatic aberration needs to be smoothly corrected. In addition, zoom lenses having a large aperture and having high brightness are required so as to smoothly perform photographing with low illumination intensity.

However, in general zoom lenses that are designed for use in a visible light region, chromatic aberration occurs in a near infrared light region, in particular, and thus, when photographing is performed in a near infrared light region at nighttime, it is difficult to control focusing.

SUMMARY

Exemplary embodiments provide a small-sized zoom lens having a large aperture and having a high optical performance from a visible light region to a near infrared light region and a photographing apparatus including the zoom lens.

According to an aspect of an exemplary embodiment, there is provided a zoom lens including, in an order from an object side to an image side: a first lens group having a negative refractive power; a second lens group having a positive refractive power; and an aperture disposed between the first lens group and the second lens group, wherein zooming is performed by varying a distance between the first lens group and the second lens group, wherein the second lens group comprises at least four lenses, wherein at least a lens surface of a lens that is disposed closest to the object side among the lenses of the second lens group is an aspherical surface, wherein at least a lens surface of a lens that is disposed closest to the image side among the lenses of the second lens group is an aspherical surface, wherein an object-side surface of a lens that is disposed third closest to the object side among the lenses of the second lens group is a convex surface, and wherein a lens that is disposed second closest to the object side among the lenses of the second lens group satisfies the following expressions:

$$65 < vd_{22}$$

$$R_{22a}/R_{22b} < 0,$$

where $vd_{22}$ is an Abbe's number of the lens that is disposed second closest to the object side among the lenses of the second lens group, $R_{22a}$ is a curvature radius of a lens surface on the object side of the lens that is disposed second closest to the object side among the lenses, and $R_{22b}$ is a curvature radius of a lens surface on the image side of the lens that is disposed second closest to the object side among the lenses.

The first lens group and the second lens group may satisfy the following expression:

$$1.0 < |f_2/f_1| < 1.5,$$

where $f_1$ is a combined focal length of the first lens group, and $f_2$ is a combined focal length of the second lens group.

The zoom lens may satisfy the following expression:

$$0.2 < f_w/f_2 < 0.4,$$

where $f_w$ is a focal length of the zoom lens in a wide mode, and $f_2$ is a combined focal length of the second lens group.

A lens that is disposed closest to the image side among lenses of the first lens group may have a positive refractive power, and the zoom lens may satisfy the following expression:

$$25 > Vd_{13},$$

where $vd13$ is an Abbe's number of the lens that is disposed closest to the image side among the lenses of the first lens group.

The second lens group may satisfy the following expression:

$$-1.5 < \beta_{t2} < -1.0,$$

where $\beta_{t2}$ is a near-axis imaging magnification of the second lens group in a tele mode.

The zoom lens may satisfy the following expression:

$$4.0 < \Sigma_d/f_t < 6.5,$$

where $\Sigma_d$ is a length of an optical axis from a vertex of the object side of the lens disposed closest to the object side among lenses of the first lens group to an image plane, and $f_t$ is a focal length of the zoom lens in a tele mode.

The aperture may be disposed such that the first lens group and the second lens group are not moved during zooming, and the zoom lens may satisfy the following expression:

$$0.8 < D_w/f_2 < 1.3$$

where $D_w$ is a distance from the aperture to a first principal point of the second lens group in a wide mode, and $f_2$ is a combined focal length of the second lens group.

According to an aspect of another exemplary embodiment, there is provided a photographing apparatus including: the aforementioned zoom lens; and a solid state imaging device for capturing an image formed by the zoom lens.

BRIEF DESCRIPTION OF THE DRAWINGS

The above and other aspects will become more apparent by describing in detail exemplary embodiments thereof with reference to the attached drawings, in which.

DETAILED DESCRIPTION OF EXEMPLARY EMBODIMENTS

Exemplary embodiments will now be described more fully with reference to the accompanying drawings.

Lens data illustrated in the following description is only an example, and the inventive concept is not limited thereto and may be properly modified within the scope of the original inventive concept.

For photographing apparatuses such as surveillance cameras, video cameras, electronic still cameras, or the like, two-group zoom lenses may be used. Two-group zoom lenses may include a first lens group having a negative refractive power and a second lens group having a positive refractive power, in which the first lens group and the second lens group may be sequentially arranged from an object side to an image side. In the two-group zooming lenses, zooming is performed by moving the second lens group in an optical axis direction, and simultaneously, a variation in an image plane caused by zooming is corrected and focusing is performed by moving the first lens group in the optical axis direction.

Figure 1:
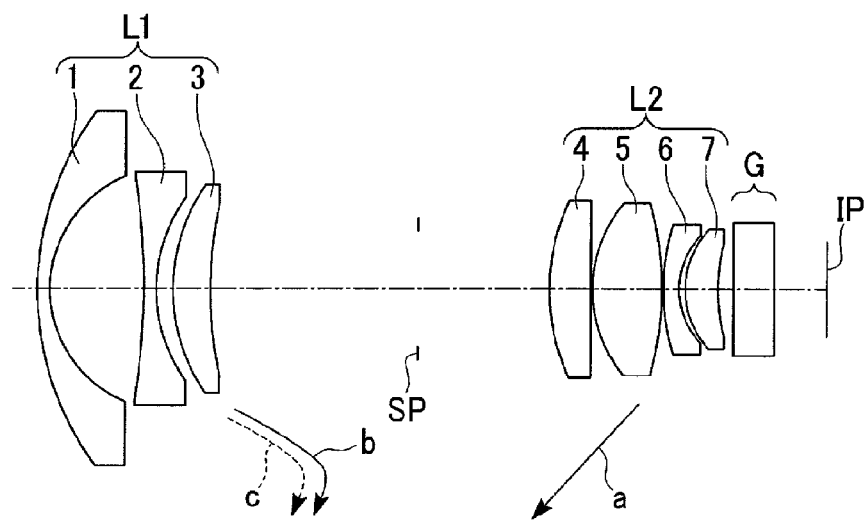
FIG. 1 is a cross-sectional view of a zoom lens according to an exemplary embodiment.

FIG. 1 is a cross-sectional view of a zoom lens according to an exemplary embodiment.

Referring to FIG. 1, the zoom lens according to the exemplary embodiment includes a first lens group L1 generally having a negative refractive power and a second lens group L2 generally having a positive refractive power. The first and second lens groups L1 and L2 are sequentially arranged from an object side to an image side of the zoom lens, as illustrated in FIG. 1. In addition, an aperture SP may be disposed between the first lens group L1 and the second lens group L2, and an optical block G that corresponds to an optical filter, a faceplate, or the like may be disposed between the second lens group L2 and an image plane IP.

With respect to the zoom lens, zooming is performed by moving the second lens group L2 in an optical axis direction according to an arrow "a" of FIG. 1, and simultaneously, a variation in the image plane IP caused by zooming is corrected and focusing is performed by moving the first lens group L1 in the optical axis direction according to an arrow "b" or "c" of FIG. 1. Thus, the overall length of the zoom lens may be reduced by efficiently using a space between the first lens group L1 and the second lens group L2.

Furthermore, the arrow "a" indicated by a solid line in FIG. 1 represent a moving path (linear path) of the second lens group L2 when zooming is performed from a wide mode to a tele mode, and the arrow "b" indicated by a solid line and the arrow "c" indicated by a dotted line in FIG. 1 represent moving paths (paths convex towards the image plane IP) of the first lens group L1 for correcting a variation in the image plane IP caused by zooming when focusing is set on an object at infinity and when focusing is set on a near object, respectively.

In addition, FIG. 1 illustrates three lenses 1 through 3 that constitute the first lens group L1 and four lenses 4 through 7 that constitute the second lens group L2. Here, the lenses 1 through 3 and 4 through 7 are sequentially arranged from the object side to the image side. The zoom lens according to the current exemplary embodiment is only an example, and the inventive concept is not limited thereto and may be properly modified within the scope of the original inventive concept.

In order to obtain a small-sized zoom lens having a large aperture and having a high optical performance from a visible light region to a near infrared light region, spherical aberration and chromatic aberration need to be properly corrected, and aberration of moving lens groups caused by miniaturization of the zoom lens needs to be suppressed.

In order to address the foregoing aspects, the second lens group L2 of the zoom lens according to the current exemplary embodiment includes at least the four lenses 4 through 7. Here, at least a lens surface of the lens 4, which is disposed closest to the object side among the lenses of the second lens group L2, is an aspherical surface, at least a lens surface of the lens 7, which is disposed closest to the image side among the lenses of the second lens group L2, is an aspherical surface, and a lens surface of the lens 6, which is disposed third closest to the object side among the lenses of the second lens group L2, is a convex surface. Thus, a variation in spherical aberration caused by zooming may be corrected by suppressing aberration in a peripheral portion of the zoom lens.

In addition, with respect to a zoom lens according to an exemplary embodiment, when an Abbe's number of the lens 5, which is the lens second closest to the object side among the lenses of the second lens group L2, is $vd_{22}$, a curvature radius of a lens surface of the lens 5 on the object side is $R_{22a}$ mm and a curvature radius of a lens surface of the lens 5 on the image side is $R_{22b}$ mm, the zoom lens may satisfy Expressions 1 and 2 as follows:

$$65 < vd_{22} \quad (1),$$

$$R_{22a}/R_{22b} < 0 \quad (2).$$

With respect to the zoom lens according to the above exemplary embodiment, when Expression 1 is satisfied, axial chromatic aberration from the visible light region to the near infrared-light region may be corrected. In addition, when Expression 2 is satisfied, axial chromatic aberration from the visible light region to the near infrared light region may be corrected while maintaining a positive refractive power.

With respect to a zoom lens according to an exemplary embodiment, when a combined focal length of the first lens group L1 is $f_1$ mm and a combined focal length of the second lens group L2 is $f_2$ mm, the zoom lens may satisfy Expression 3 as follows:

$$1.0 < |f_2/f_1| < 1.5 \quad (3).$$

In the above, when $|f_2/f_1|$ is less than the lower limit value of Expression 3, the negative refractive power of the first lens group L1 may be deteriorated, and thus, the zoom lens having a wide angle of view may not be easily realized. In addition, the positive refractive power of the second lens group L2 may be increased, and thus, spherical aberration may be excessively corrected, and the zoom lens having a large aperture may not be easily realized. On the other hand, when $|f_2/f_1|$ is greater than the upper limit value of Expression 3, the positive refractive power of the second lens group L2 may be deteriorated, and thus, movement from the wide mode to the tele mode during zooming may increase, and the overall length of the zoom lens may increase.

A zoom lens according to an exemplary embodiment invention may satisfy Expression 3' as follows:

$$1.05 < |f_2/f_1| < 1.3 \quad (3)'.$$

With respect to a zoom lens according to an exemplary embodiment, when a focal length of the zoom lens in the wide mode is $f_w$ mm, the zoom lens may satisfy Expression 4 as follows:

$$0.2 < f_w/f_2 < 0.4 \quad (4).$$

In the above, when $|f_w/f_2|$ is less than the lower limit value of Expression 4, spherical aberration may be excessively corrected, and coma aberration may not be sufficiently corrected. On the other hand, when $|f_w/f_2|$ is greater than the upper limit value of Expression 3, spherical aberration and axial chromatic aberration may not be sufficiently corrected, and coma aberration may be excessively corrected.

A zoom lens according to an exemplary embodiment may satisfy Expression 4' as follows:

$$0.25 < f_w/f_2 < 0.35 \quad (4)'.$$

With respect to a zoom lens according to an exemplary embodiment, when the lens 3, which is disposed closest to the image side among the lenses of the first lens group L1, has a positive refractive power and an Abbe's number of the lens 3 is $vd_{13}$, the zoom lens may satisfy Expression 5 as follows:

$$25 > vd_{13} \quad (5).$$

In the above, when $vd_{13}$ is greater than the upper limit value of Equation 5, correction of axial chromatic aberration from the visible light region to the near infrared light region may not be easily performed.

According to an exemplary embodiment, when a near-axis imaging magnification of the second lens group L2 in the tele mode is $\beta_{t2}$, a zoom lens may satisfy Expression 6 as follows:

$$-1.5 < \beta_{t2} < -1.0 \quad (6).$$

When $\beta_{t2}$ is less than the lower limit value of Expression 6, distortion aberration at the wide mode may not be easily corrected. In addition, when $\beta_{t2}$ is greater than the upper limit value of Equation 6, movement from the wide mode to the tele mode during zooming may increase, and thus, the overall length of the zoom lens may increase.

A zoom lens according to an exemplary embodiment may satisfy Expression 6' as follows:

$$-1.3 < \beta_{t2} < -1.1 \quad (6)'.$$

With respect to a zoom lens according to an Examiner embodiment, when a length of an optical axis from a vertex of the object side of the lens 1 disposed closest to the object side among the lenses of the first lens group L1 to the image plane IP is $\Sigma_d$ mm and a focal length of the zoom lens in the tele mode is $f_t$ mm, the zoom lens may satisfy Expression 7 as follows:

$$4.0 < \Sigma_d/f_t < 6.5 \quad (7).$$

In the above, when $\Sigma_d/f_t$ is less than the lower limit value of Expression 7, miniaturization of the zoom lens may be achieved, but an astigmatic field curvature may not be easily corrected. In addition, when $\Sigma_d/f_t$ is greater than the upper limit value of Expression 7, aberration correction is easily performed, but the overall length of the zoom lens increases.

A zoom lens according to an exemplary embodiment may satisfy Expression 7' as follows:

$$4.5 < \Sigma_d/f_t < 6.0 \quad (7)'.$$

With respect to a zoom lens according to an exemplary embodiment, when the aperture SP between the first lens group L1 and the second lens group L2 is disposed by fixing, wherein a distance between the aperture SP and the image plane IP is fixed during zooming, a distance from the aperture SP to a first principal point (principal point on the object side) of the second lens group L2 in the wide mode is $D_w$ mm, and the combined focal length of the second lens group L2 is $f_2$ mm, the zoom lens may satisfy Expression 8 as follows:

$$0.8 < D_w/f_2 < 1.3 \quad (8).$$

When $D_w/f_2$ is less than the lower limit value of Expression 8, exit pupil distance may not be sufficiently obtained, and light may not be incident on the image plane IP in a perpendicular direction. On the other hand, when $D_w/f_2$ is less than the upper limit value of Expression 8, a diameter of the second lens group L2 may increase, and thus, the overall length of the zoom lens may increase.

Also, the zoom lens according to an exemplary embodiment may satisfy Expression 8' as follows:

$$0.9 < D_w/f_2 < 1.2 \quad (8)'.$$

With respect to the zoom lens according to the above exemplary embodiments, when the conditions described above are satisfied, aberrations may be smoothly corrected from the visible light region to the near infrared light region. Thus, a good optical performance from the wide mode to the tele mode may be obtained, and simultaneously, the overall length of the zoom lens may be reduced, thereby further miniaturizing the zoom lens.

As above, a small-sized zoom lens having a large aperture may obtain a high optical performance and may be used as a photographing optical system for a photographing apparatus, such as a surveillance camera, a digital video camera, a digital still camera, or the like. When the zoom lens is used as a surveillance camera that may operate in the daytime and at nighttime, chromatic aberration occurring in the near infrared light region, in particular, may be smoothly corrected, and simultaneously, a variation in spherical aberration caused by zooming may be easily corrected, and the zoom lens usable in the visible light region and the near infrared light region may be realized so as to perform photographing with low illumination intensity.

A photographing apparatus including the zoom lens according to the above exemplary embodiments is configured to form an image on a photographing plane of a solid state imaging device in which light incident on the object side of the zoom lens is finally irradiated on the image plane IP (photoelectric conversion device), which may be a charge coupled device (CCD) or a complementary metal-oxide semiconductor device (CMOS) sensor. The photographing apparatus photoelectrically converts light that is incident on an object into an electrical signal, generates a digital image corresponding to an image of a subject, and records the digital image on a recording medium, such as a hard disk drive (HDD), a memory card, an optical disc, or a magnetic tape. Furthermore, when the photographing apparatus is a silver halide film type camera, the image plane IP corresponds to a film plane.

Hereinafter, effects of the inventive concept will be more clarified by describing the following exemplary embodiments. However, the inventive concept is not limited thereto and may be properly modified within the scope of the original inventive concept.

Exemplary Embodiment 1

Figure 2:
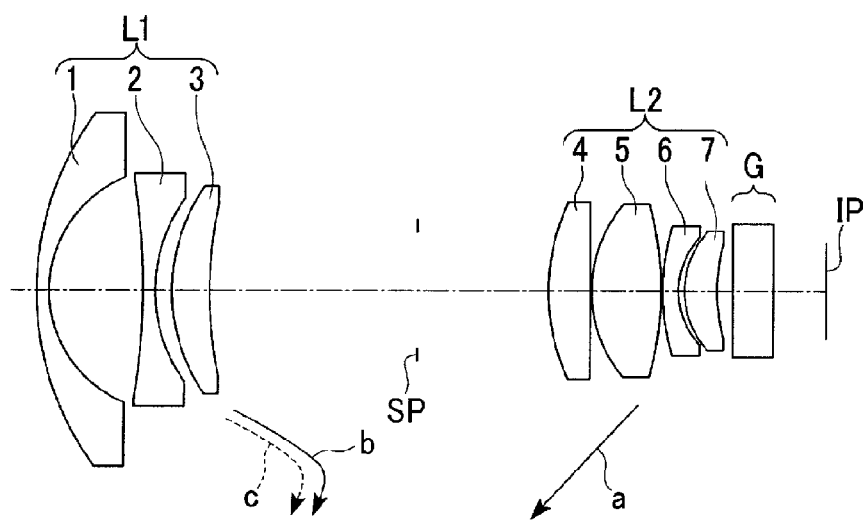
FIG. 2 is a cross-sectional view of a zoom lens according to another exemplary embodiment.

A structure of a zoom lens based on design data of a first exemplary embodiment is illustrated in FIG. 2. The zoom lens of FIG. 2 has the same structure as the zoom lens of FIG. 1, and the following tables 1 through 4 show the design data of the zoom lens of FIG. 2.

TABLE 1

| Number of surface (i) | Lens (GjRk) | Radius of curvature (R) | Thickness or distance (D) | Refractive index (Nd) | Abbe's number (Vd) |
|---|---|---|---|---|---|
| 1 | G1R1 | 18.671 | 0.850 | 1.83400 | 37.35 |
| 2 | G1R2 | 7.780 | 6.090 | | |
| 3 | G2R1 | −49.352 | 0.800 | 1.77250 | 49.62 |
| 4 | G2R2 | 9.514 | 1.100 | | |
| 5 | G3R1 | 11.390 | 2.521 | 1.92286 | 20.88 |
| 6 | G3R2 | 29.000 | Variable 1 | | |
| 7 | Aperture | — | Variable 2 | | |
| 8 | G4R1 | 9.710 | 2.708 | 1.51633 | 64.07 |
| 9 | G4R2 | 130.578 | 0.150 | | |
| 10 | G5R1 | 8.829 | 4.453 | 1.49700 | 81.61 |
| 11 | G5R2 | −21.937 | 0.150 | | |
| 12 | G6R1 | 15.801 | 1.000 | 1.92286 | 20.88 |

TABLE 1-continued

| Number of surface (i) | Lens (GjRk) | Radius of curvature (R) | Thickness or distance (D) | Refractive index (Nd) | Abbe's number (Vd) |
|---|---|---|---|---|---|
| 13 | G6R2 | 4.952 | 0.350 | | |
| 14 | G7R1 | 5.536 | 2.145 | 1.80860 | 40.42 |
| 15 | G7R2 | 17.210 | Variable 3 | | |
| 16 | Plane | 1.00E+18 | 2.780 | 1.51680 | 64.20 |
| 17 | Plane | 1.00E+18 | 3.399 | | |

TABLE 2

| | Wide mode | Normal mode | Tele mode |
|---|---|---|---|
| Focal length | 2.82 | 4.90 | 9.68 |
| F number | 1.26 | 1.59 | 2.44 |
| Variable 1 | 13.54 | 4.06 | 1.40 |
| Variable 2 | 8.52 | 6.26 | 1.05 |
| Variable 3 | 0.95 | 3.21 | 8.42 |

TABLE 3

| Expression | Exemplary Embodiment 1 |
|---|---|
| (1) $vd_{22}$ | 81.61 |
| (2) $R_{22a}/R_{22b}$ | −0.40 |
| (3) $|f_2/f_1|$ | 1.08 |
| (4) $f_w/f_2$ | 0.31 |
| (5) $vd_{13}$ | 20.88 |
| (6) $\beta_{t2}$ | −1.14 |
| (7) $\Sigma_d/f_t$ | 5.32 |
| (8) $D_w/f_2$ | 0.99 |

TABLE 4

| | Number of surface | | |
|---|---|---|---|
| | 8 | 9 | 15 |
| C | 0.10299 | 0.00766 | 0.05810 |
| K | 0 | 0 | 0 |
| $A_4$ | −2.6651E−04 | −2.2672E−05 | 5.3511E−04 |
| $A_6$ | −5.0116E−06 | −5.6152E−06 | 2.0734E−05 |
| $A_8$ | 9.2186E−08 | 0.0000E+00 | 4.8989E−07 |
| $A_{10}$ | 0.0000E+00 | 0.0000E+00 | 0.0000E+00 | i the number of surface column (where i is a natural number) in Table 1 represents an $i^{th}$ surface, wherein a $1^{st}$ surface represents a lens surface that is closest to the object side, and i gradually increases toward the image side so that a $17^{th}$ surface represents a surface of optical block G that is closest to the image plane IP.

In addition, with respect to GjRk of the lens column in Table 1 (where j is a natural number and k is 1 or 2), G represents a lens position when a first lens is a lens closest to the object side and a last lens is a lens closest to the image side. R represents a lens surface of the object side when set as 1 and a lens surface of the image side when set as 2. Also, GjRk is applied to aperture SP and optical block G.

In Table 1, R represents a curvature radius (mm) of a lens surface (where a surface having R of ∞ represents a plane).

In Table 1, D represents an axial surface distance (mm) between an $i^{th}$ surface and an $(i+1)^{th}$ surface, and when D varies, D represents an axial surface distance (mm) in the wide mode, a normal mode, or the tele mode in Tables 1 and 2. Meanwhile, the focal length and the F number of the zoom lens in the wide mode, the normal mode, and the tele mode, respectively, are indicated in Table 2.

In Table 1, Nd represents a refractive index, and Vd represents an Abbe's number.

Table 3 shows expressions and values of (1) $vd_{22}$, (2) $R_{22a}/R_{22b}$, (3) $|f_2/f_1|$, (4) $f_w/f_2$, (5) $vd_{13}$, (6) $\beta_{t2}$, (7) $\Sigma_d/f_t$, and (8) $D_w/f_2$.

Table 4 shows surface numbers and aspherical coefficients of aspherical lenses. The aspherical surfaces may be indicated using the following aspherical Equation.

$$x = \frac{ch^2}{1 + \sqrt{1 - (k+1)c^2h^2}} + \sum_{i=2}^{6} A_{2i}h^{2i},$$

where x is a distance from a vertex of a lens in optical axis direction, h is a distance in a direction perpendicular to the optical axis, K is a conic constant, $A_{2i}$, is an aspherical coefficient, and c is a reciprocal (1/R) of a curvature radius at the vertex of the lens.

Figure 3:
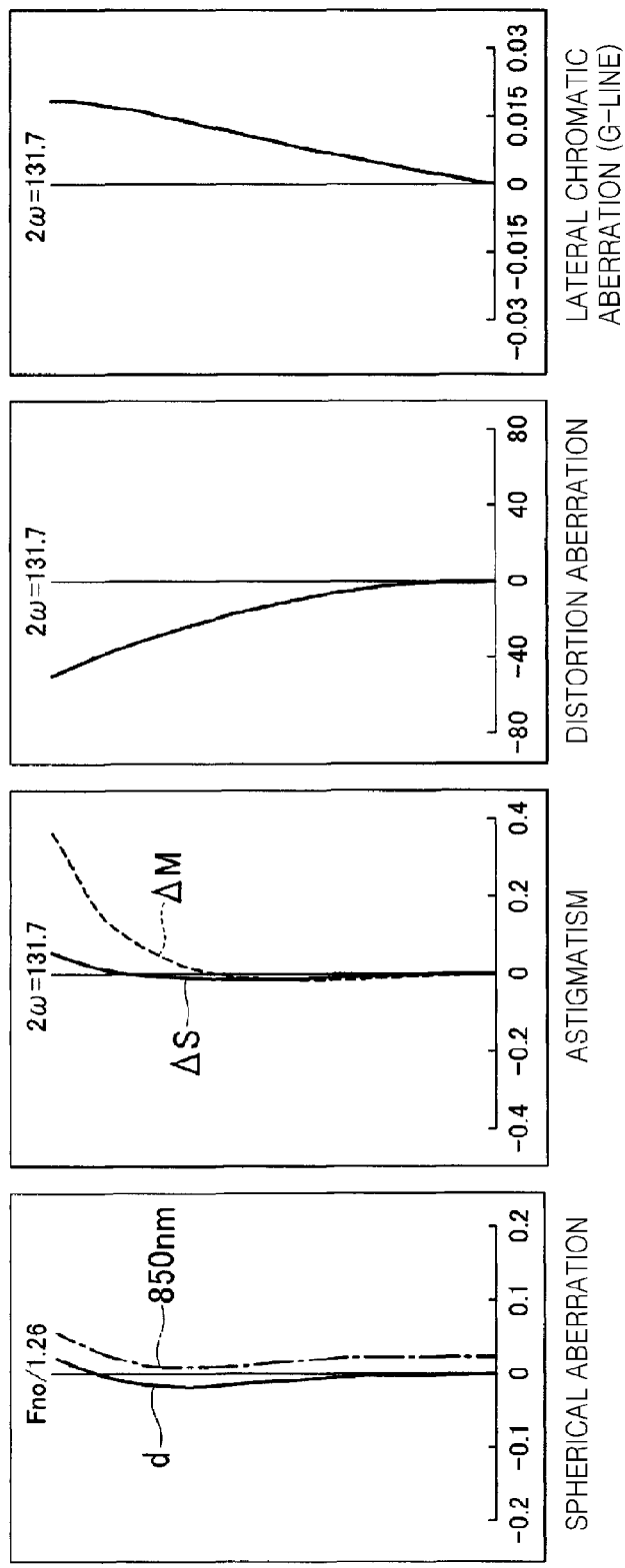
FIG. 3 illustrates charts of aberration showing spherical aberration, astigmatism, distortion aberration, and lateral chromatic aberration in a wide mode of the zoom lens of FIG. 2, respectively, according to an exemplary embodiment.
Figure 4:
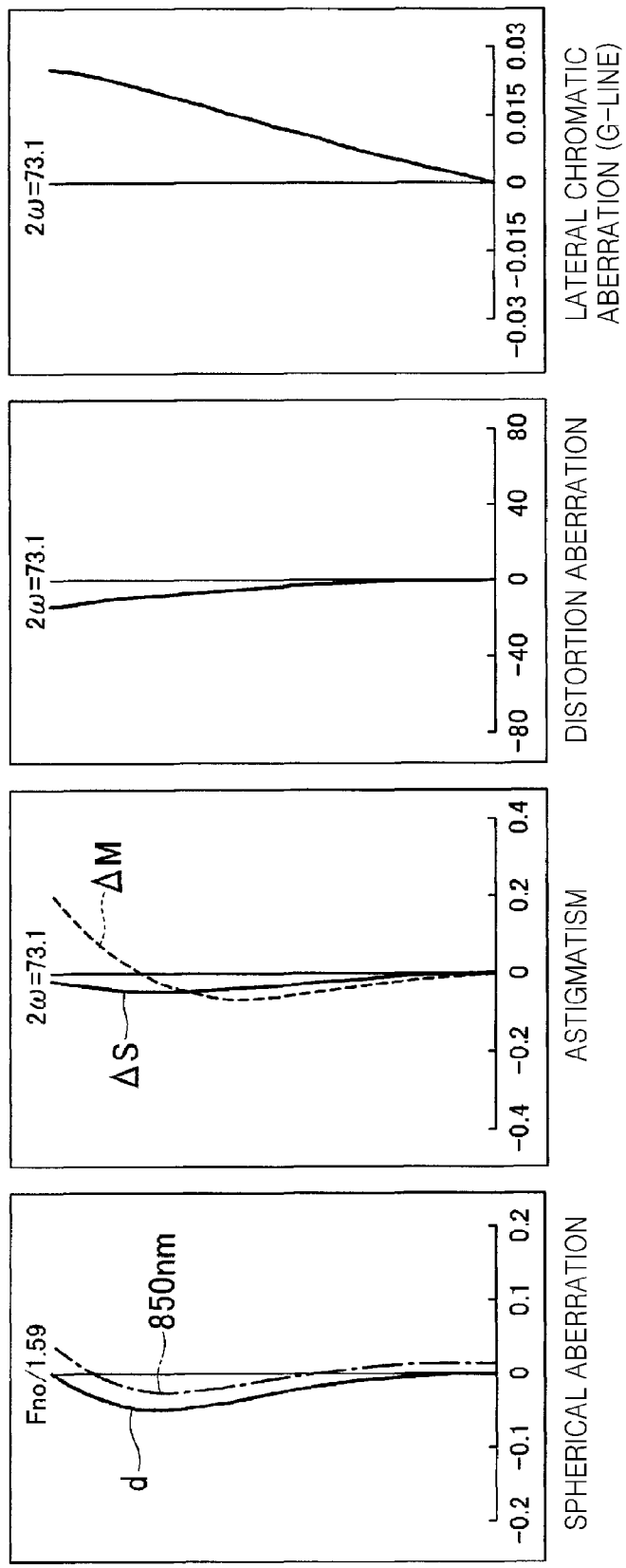
FIG. 4 illustrates charts of aberration showing spherical aberration, astigmatism, distortion aberration, and lateral chromatic aberration in a normal mode of the zoom lens of FIG. 2, respectively, according to an exemplary embodiment.
Figure 5:
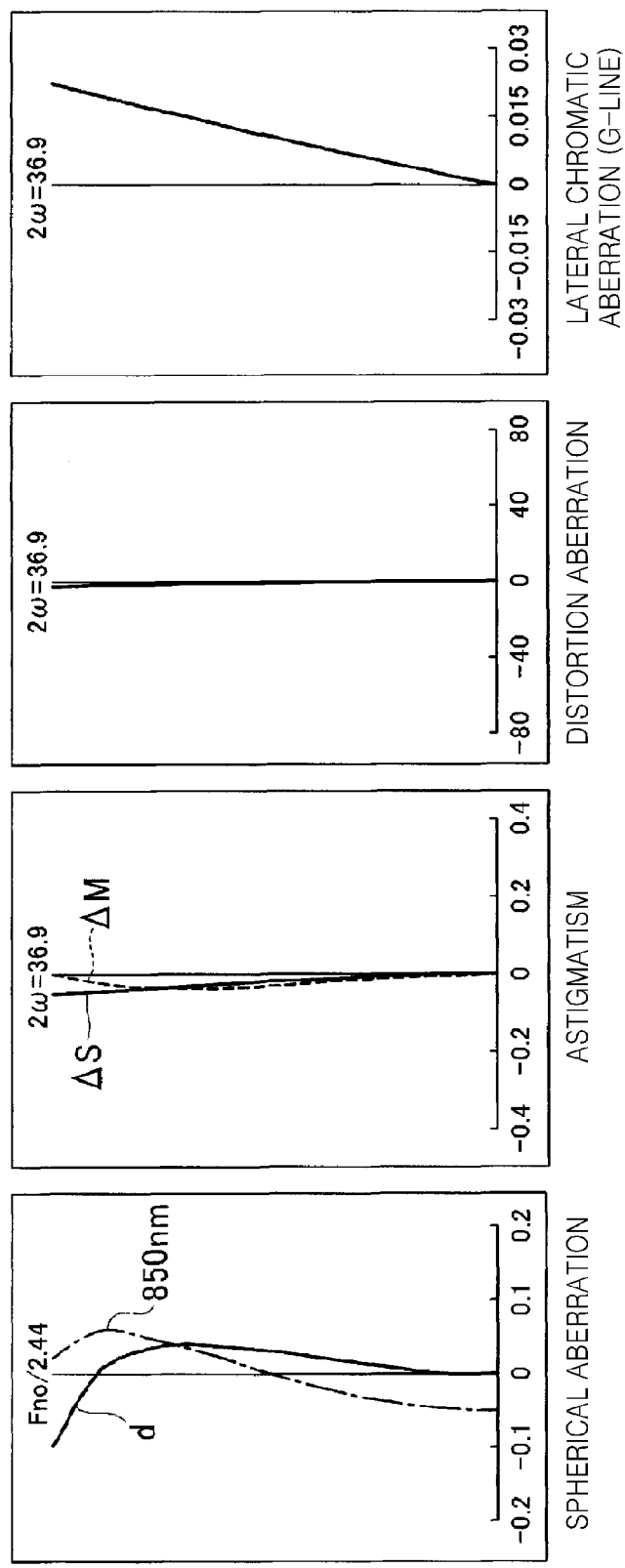
FIG. 5 illustrates charts of aberration showing spherical aberration, astigmatism, distortion aberration, and lateral chromatic aberration in a tele mode of the zoom lens of FIG. 2, respectively, according to an exemplary embodiment.

Spherical aberration, astigmatism, distortion aberration, and lateral chromatic aberration of the zoom lens having the above structure according to the first exemplary embodiment are shown in FIGS. 3, 4, and 5.

FIG. 3 illustrates aberrations in the wide mode, and FIG. 4 illustrates aberrations in the normal mode, and FIG. 5 illustrates aberrations in the tele mode.

Spherical aberration by d-line (a wavelength of 587.56 nm) is indicated by a solid line, and spherical aberration in the near infrared light region (a wavelength of 850 nm) is indicated by a dash-dot line.

Astigmatism is indicated by a saggital ray ΔS and a meridional ray ΔM for each wavelength.

Distortion aberration according to a wavelength of 587.56 nm is indicated.

Lateral chromatic aberration by g-line (a wavelength of 435.84 nm) is indicated.

The zoom lens according to the first exemplary embodiment satisfies conditions as shown in Tables 1 through 4. The zoom lens according to the first exemplary embodiment may properly correct each of the aforementioned aberrations, as illustrated in FIGS. 3, 4, and 5.

Exemplary Embodiment 2

Figure 6:
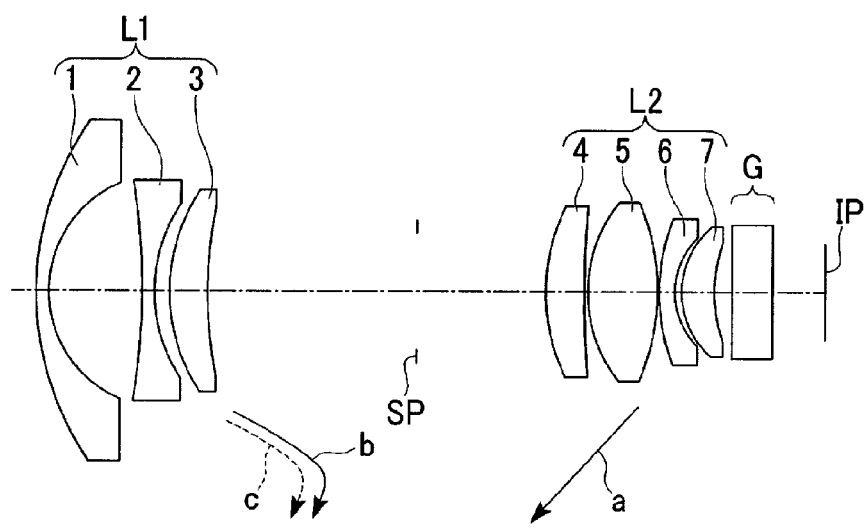
FIG. 6 is a cross-sectional view of a zoom lens according to another exemplary embodiment.

A structure of a zoom lens based on design data of a second exemplary embodiment is shown in FIG. 6. The zoom lens of FIG. 6 according to the second exemplary embodiment has the same structure as the zoom lens of FIG. 1, and the following tables 5 through 8 show the design data of the zoom lens.

An indication method of tables 5 through 8 is the same as that of tables 1 through 4.

TABLE 5

| Number of surface (i) | Lens (GjRk) | Radius of curvature (R) | Thickness or distance (D) | Refractive index (Nd) | Abbe's number (Vd) |
|---|---|---|---|---|---|
| 1 | G1R1 | 19.702 | 0.850 | 1.83400 | 37.35 |
| 2 | G1R2 | 7.700 | 6.100 | | |
| 3 | G2R1 | −54.872 | 0.800 | 1.77250 | 49.62 |
| 4 | G2R2 | 10.505 | 1.050 | | |
| 5 | G3R1 | 12.002 | 2.436 | 1.92286 | 20.88 |
| 6 | G3R2 | 30.000 | Variable 1 | | |
| 7 | Aperture | — | Variable 2 | | |
| 8 | G4R1 | 9.000 | 2.577 | 1.51633 | 64.07 |
| 9 | G4R2 | 43.369 | 0.150 | | |
| 10 | G5R1 | 9.477 | 4.466 | 1.49700 | 81.61 |
| 11 | G5R2 | −15.822 | 0.150 | | |
| 12 | G6R1 | 13.891 | 1.000 | 1.92286 | 20.88 |
| 13 | G6R2 | 4.931 | 0.514 | | |
| 14 | G7R1 | 5.648 | 2.151 | 1.80860 | 40.42 |
| 15 | G7R2 | 15.006 | Variable 3 | | |
| 16 | Plane | 1.00E+18 | 2.780 | 1.51680 | 64.20 |
| 17 | Plane | 1.00E+18 | 3.400 | | |

TABLE 6

| | Wide mode | Normal mode | Tele mode |
|---|---|---|---|
| Focal length | 2.88 | 4.90 | 9.68 |
| F number | 1.26 | 1.52 | 2.43 |
| Variable 1 | 13.68 | 4.30 | 1.30 |
| Variable 2 | 8.35 | 6.18 | 1.03 |
| Variable 3 | 1.04 | 3.21 | 8.36 |

TABLE 7

| Expression | Exemplary Embodiment 2 |
|---|---|
| (1) $vd_{22}$ | 81.61 |
| (2) $R_{22a}/R_{22b}$ | −0.60 |
| (3) $|f_2/f_1|$ | 1.07 |
| (4) $f_w/f_2$ | 0.31 |
| (5) $vd_{13}$ | 20.88 |
| (6) $\beta_{t2}$ | −1.12 |
| (7) $\Sigma_d/f_t$ | 5.32 |
| (8) $D_w/f_2$ | 0.97 |

TABLE 8

| | Number of surface | | |
|---|---|---|---|
| | 8 | 9 | 15 |
| C | 0.11111 | 0.02306 | 0.06664 |
| K | 0 | 0 | 0 |
| $A_4$ | −3.8103E−04 | −6.3247E−05 | 4.7327E−04 |
| $A_6$ | −6.1883E−06 | −5.9984E−06 | 2.6777E−05 |
| $A_8$ | −1.4351E−07 | 0.0000E+00 | −1.2148E−07 |
| $A_{10}$ | 0.0000E+00 | 0.0000E+00 | 0.0000E+00 |

Figure 7:
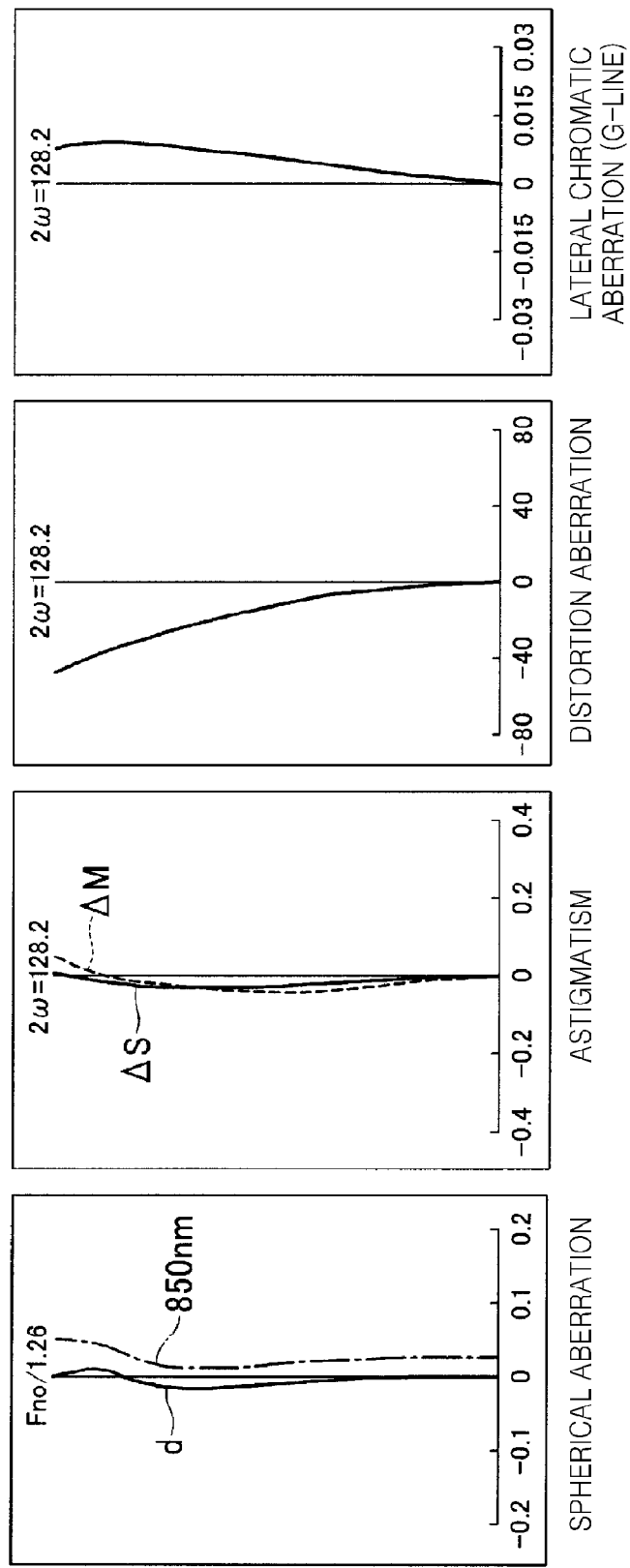
FIG. 7 illustrates charts of aberration showing spherical aberration, astigmatism, distortion aberration, and lateral chromatic aberration in a wide mode of the zoom lens of FIG. 6, respectively, according to an exemplary embodiment.
Figure 8:
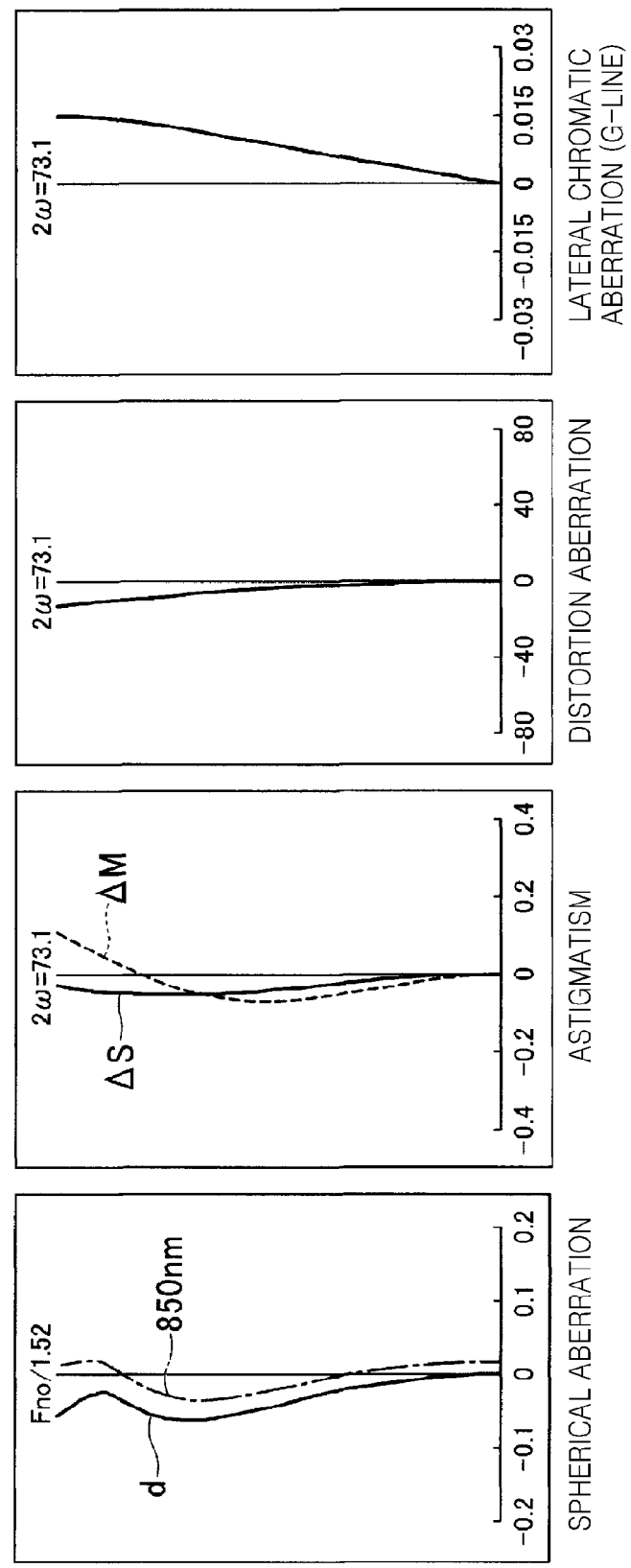
FIG. 8 illustrates charts of aberration showing spherical aberration, astigmatism, distortion aberration, and lateral chromatic aberration in a normal mode of the zoom lens of FIG. 6, respectively, according to an exemplary embodiment.
Figure 9:
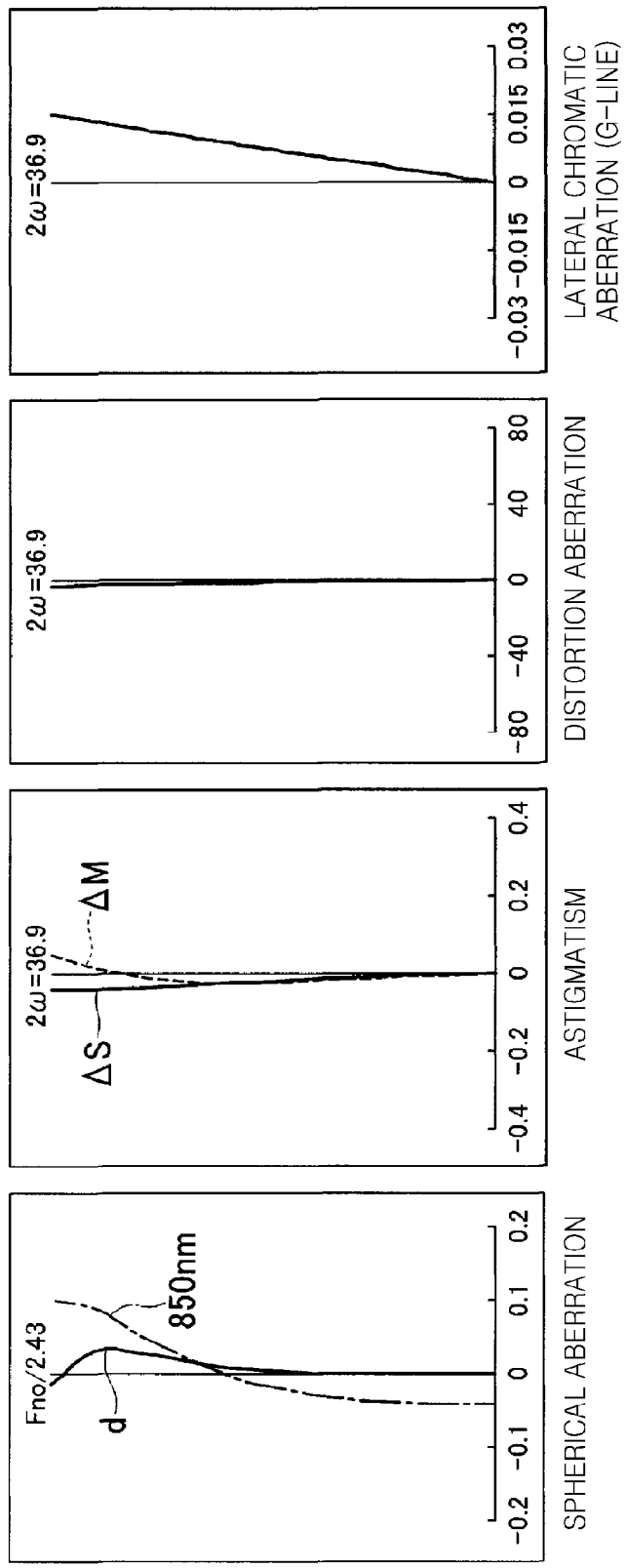
FIG. 9 illustrates charts of aberration showing spherical aberration, astigmatism, distortion aberration, and lateral chromatic aberration in a tele mode of the zoom lens of FIG. 6, respectively, according to an exemplary embodiment.

Spherical aberration, astigmatism, distortion aberration, and chromatic aberration of magnification of the zoom lens according to the second exemplary embodiment are shown in FIGS. 7, 8, and 9. An indication method of FIGS. 7 through 9 is the same as that of FIGS. 3 through 5.

The zoom lens of the second exemplary embodiment satisfies conditions as illustrated in Tables 5 through 8. The zoom lens of the second exemplary embodiment may properly correct each of the aforementioned aberration, as illustrated in FIGS. 7, 8, and 9.

Exemplary Embodiment 3

Figure 10:
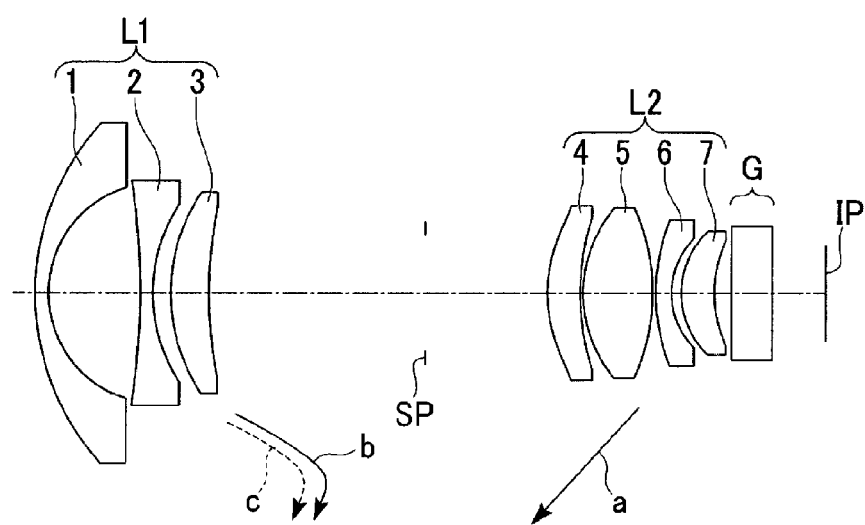
FIG. 10 is a cross-sectional view of a zoom lens according to another exemplary embodiment.

A structure of a zoom lens based on design data of a third exemplary embodiment is shown in FIG. 10. The zoom lens of FIG. 10 has the same structure as the zoom lens of FIG. 1, and the following tables 9 through 12 show the design data of the zoom lens. An indication method of tables 9 through 12 is the same as that of tables 1 through 4.

TABLE 9

| Number of surface (i) | Lens (GjRk) | Radius of curvature (R) | Thickness or distance (D) | Refractive index (Nd) | Abbe's number (Vd) |
|---|---|---|---|---|---|
| 1 | G1R1 | 16.385 | 0.850 | 1.80420 | 46.50 |
| 2 | G1R2 | 7.164 | 6.000 | | |
| 3 | G2R1 | −44.981 | 0.800 | 1.77250 | 49.62 |
| 4 | G2R2 | 10.994 | 1.346 | | |
| 5 | G3R1 | 12.561 | 2.313 | 1.92286 | 20.88 |
| 6 | G3R2 | 28.612 | Variable 1 | | |
| 7 | Aperture | — | Variable 2 | | |
| 8 | G4R1 | 8.524 | 2.175 | 1.51633 | 64.07 |
| 9 | G4R2 | 17.989 | 0.150 | | |
| 10 | G5R1 | 8.770 | 4.668 | 1.49700 | 81.61 |
| 11 | G5R2 | −12.787 | 0.150 | | |
| 12 | G6R1 | 15.184 | 1.000 | 1.92286 | 20.88 |
| 13 | G6R2 | 5.336 | 0.621 | | |
| 14 | G7R1 | 5.456 | 2.298 | 1.80860 | 40.42 |
| 15 | G7R2 | 12.914 | Variable 3 | | |
| 16 | Plane | 1.00E+18 | 2.780 | 1.51680 | 64.20 |
| 17 | Plane | 1.00E+18 | 3.399 | | |

TABLE 10

| | Wide mode | Normal mode | Tele mode |
|---|---|---|---|
| Focal length | 2.80 | 4.90 | 9.98 |
| F number | 1.27 | 1.57 | 2.54 |
| Variable 1 | 14.11 | 4.20 | 1.40 |
| Variable 2 | 7.87 | 5.62 | 0.15 |
| Variable 3 | 0.97 | 3.22 | 8.69 |

TABLE 11

| Expression | Exemplary Embodiment 3 |
|---|---|
| (1) $vd_{22}$ | 81.61 |
| (2) $R_{22a}/R_{22b}$ | −0.69 |
| (3) $|f_2/f_1|$ | 1.07 |
| (4) $f_w/f_2$ | 0.30 |
| (5) $vd_{13}$ | 20.88 |
| (6) $\beta_{t2}$ | −1.16 |
| (7) $\Sigma_d/f_t$ | 5.16 |
| (8) $D_w/f_2$ | 0.96 |

TABLE 12

| | Number of surface | | |
|---|---|---|---|
| | 8 | 9 | 15 |
| C | 0.11731 | 0.05559 | 0.07743 |
| K | 0 | 0 | 0 |
| $A_4$ | −2.9253E−04 | 1.2918E−04 | 7.8022E−04 |
| $A_6$ | −3.1540E−06 | −1.3051E−06 | 3.1728E−05 |
| $A_8$ | −1.8741E−07 | 0.0000E+00 | 1.0529E−06 |
| $A_{10}$ | 0.0000E+00 | 0.0000E+00 | 0.0000E+00 |

Figure 11:
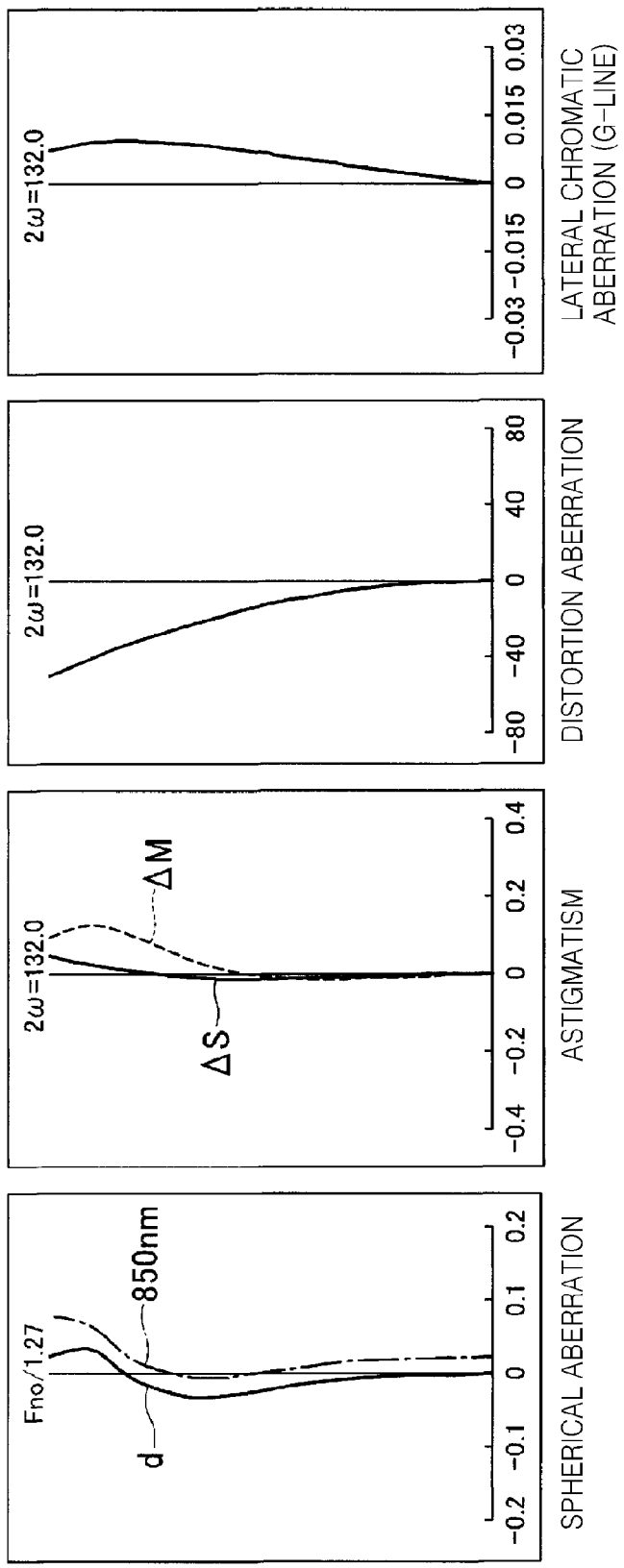
FIG. 11 illustrates charts of aberration showing spherical aberration, astigmatism, distortion aberration, and lateral chromatic aberration in a wide mode of the zoom lens of FIG. 10, respectively, according to an exemplary embodiment.
Figure 12:
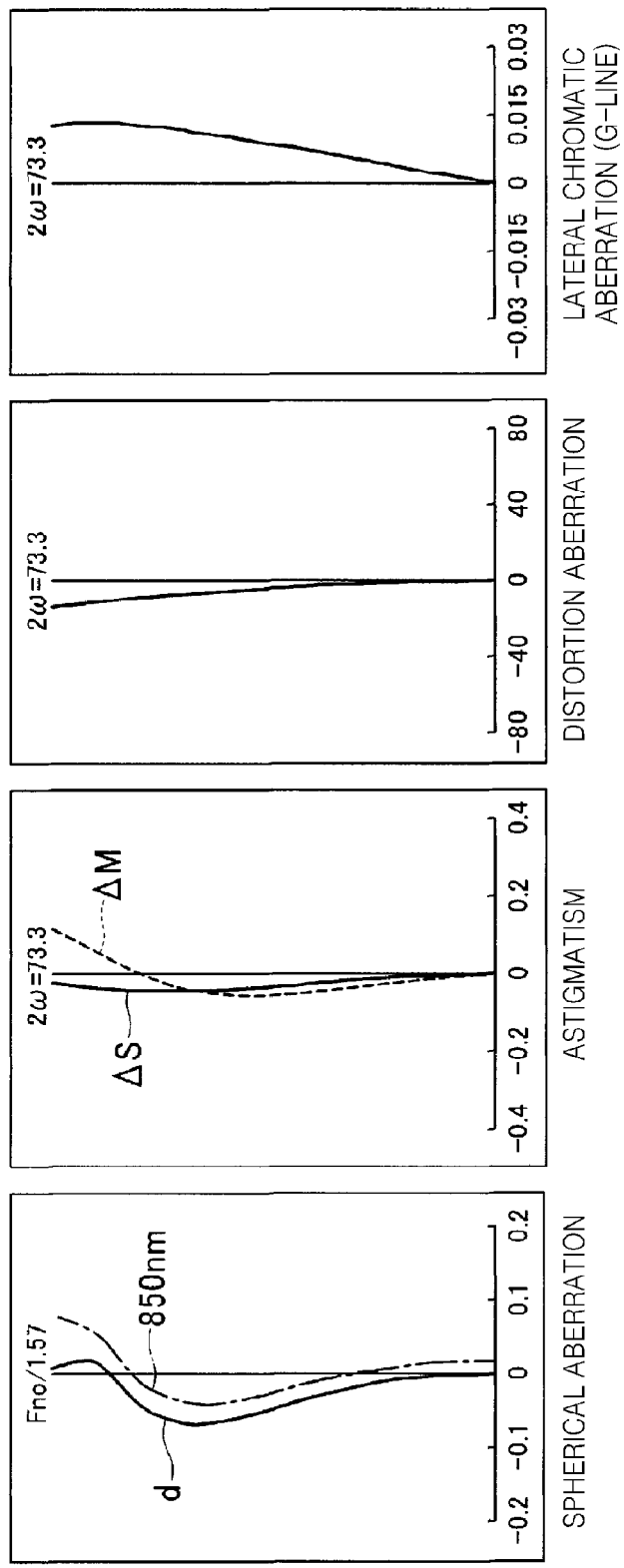
FIG. 12 illustrates charts of aberration showing spherical aberration, astigmatism, distortion aberration, and lateral chromatic aberration in a normal mode of the zoom lens of FIG. 10, respectively, according to an exemplary embodiment.
Figure 13:
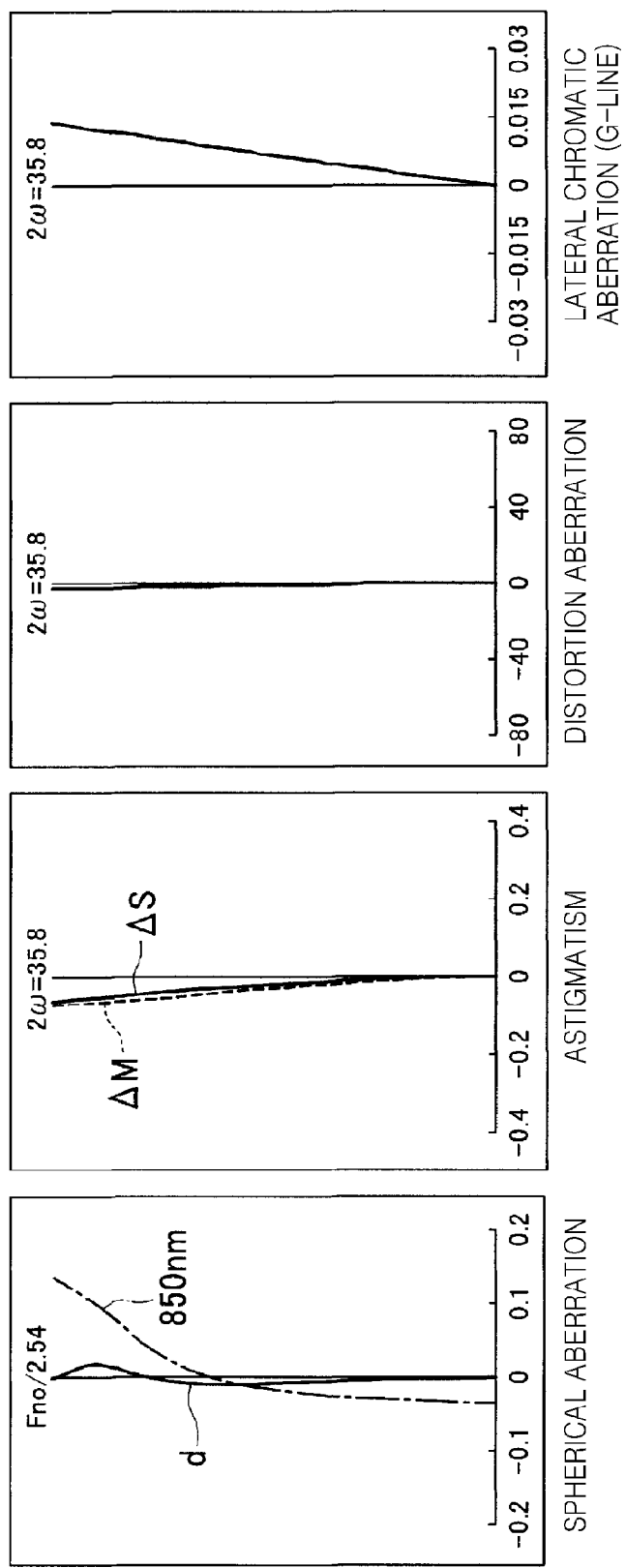
FIG. 13 illustrates charts of aberration showing spherical aberration, astigmatism, distortion aberration, and lateral chromatic aberration in a tele mode of the zoom lens of FIG. 10, respectively, according to an exemplary embodiment.

Spherical aberration, astigmatism, distortion aberration, and chromatic difference of magnification of the zoom lens having the above structure according to the third exemplary embodiment are shown in FIGS. 11, 12, and 13. An indication method of FIGS. 11, 12, and 13 is the same as that of FIGS. 3 through 5.

The zoom lens of the third exemplary embodiment satisfies conditions as shown in Tables 9 through 12. The zoom lens of the third exemplary embodiment may properly correct each of the aforementioned aberration, as illustrated in FIGS. 11, 12, and 13.

Exemplary Embodiment 4

Figure 14:
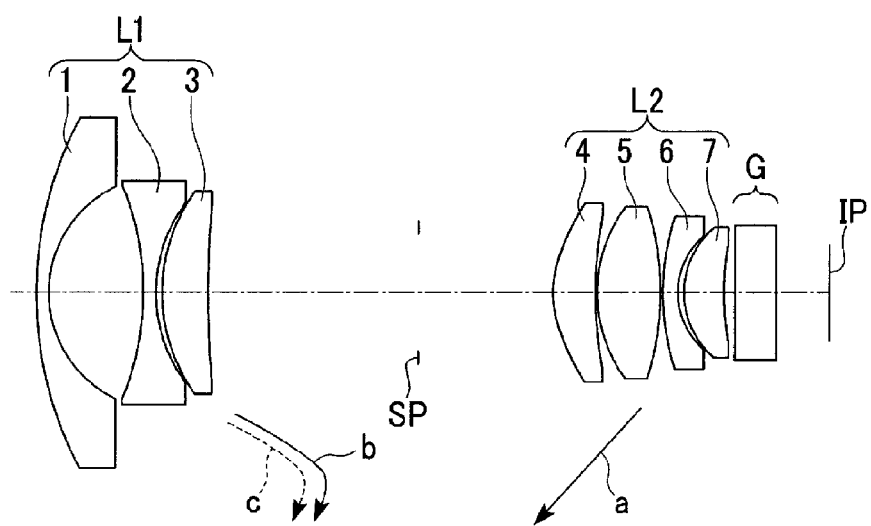
FIG. 14 is a cross-sectional view of a zoom lens according to another exemplary embodiment.

A structure of a zoom lens based on design data of a fourth exemplary embodiment is shown in FIG. 14. The zoom lens of FIG. 14 has the same structure as the zoom lens of FIG. 1, and the following tables 13 through 16 show the design data of the zoom lens of the fourth exemplary embodiment. Also, an indication method of tables 13 through 16 is the same as that of tables 1 through 5.

TABLE 13

| Number of surface (i) | Lens (GjRk) | Radius of curvature (R) | Thickness or distance (D) | Refractive index (Nd) | Abbe's number (Vd) |
|---|---|---|---|---|---|
| 1 | G1R1 | 24.131 | 0.850 | 1.80610 | 33.27 |
| 2 | G1R2 | 7.780 | 6.152 | | |
| 3 | G2R1 | −19.150 | 0.800 | 1.66672 | 48.30 |
| 4 | G2R2 | 9.524 | 0.421 | | |
| 5 | G3R1 | 10.926 | 3.027 | 1.92286 | 20.88 |
| 6 | G3R2 | 57.067 | Variable 1 | | |
| 7 | Aperture | — | Variable 2 | | |
| 8 | G4R1 | 7.706 | 2.768 | 1.51633 | 64.07 |
| 9 | G4R2 | 28.854 | 0.150 | | |
| 10 | G5R1 | 9.726 | 4.125 | 1.49700 | 81.61 |
| 11 | G5R2 | −18.169 | 0.150 | | |
| 12 | G6R1 | 17.412 | 1.000 | 1.92286 | 20.88 |
| 13 | G6R2 | 5.070 | 0.473 | | |
| 14 | G7R1 | 5.828 | 2.581 | 1.80860 | 40.42 |
| 15 | G7R2 | 25.968 | Variable 3 | | |
| 16 | Plane | 1.00E+18 | 2.780 | 1.51680 | 64.20 |
| 17 | Plane | 1.00E+18 | 3.409 | | |

TABLE 14

| | Wide mode | Normal mode | Tele mode |
|---|---|---|---|
| Focal length | 2.75 | 4.90 | 10.48 |
| F number | 1.24 | 1.50 | 2.59 |
| Variable 1 | 13.73 | 3.31 | 0.65 |
| Variable 2 | 8.88 | 6.57 | 0.55 |
| Variable 3 | 0.70 | 3.01 | 9.03 |

TABLE 15

| Expression | Exemplary Embodiment 4 |
|---|---|
| (1) $vd_{22}$ | 81.61 |
| (2) $R_{22a}/R_{22b}$ | −0.54 |
| (3) $|f_2/f_1|$ | 1.07 |
| (4) $f_w/f_2$ | 0.30 |
| (5) $vd_{13}$ | 20.88 |
| (6) $\beta_{t2}$ | −1.22 |
| (7) $\Sigma_d/f_t$ | 4.96 |
| (8) $D_w/f_2$ | 1.07 |

TABLE 16

| | Number of surface | | | |
|---|---|---|---|---|
| | 8 | 9 | 14 | 15 |
| C | 0.12978 | 0.03466 | 0.17159 | 0.03851 |
| K | 0 | 0 | 0 | 0 |
| $A_4$ | −2.5907E−04 | 1.8515E−04 | −4.2446E−05 | 3.0457E−04 |
| $A_6$ | −3.8136E−06 | −4.9586E−06 | 3.9881E−06 | 2.7436E−05 |
| $A_8$ | −1.3436E−07 | 0.0000E+00 | −1.0308E−06 | −1.9601E−06 |
| $A_{10}$ | 0.0000E+00 | 0.0000E+00 | 0.0000E+00 | 0.0000E+00 |

Figure 15:
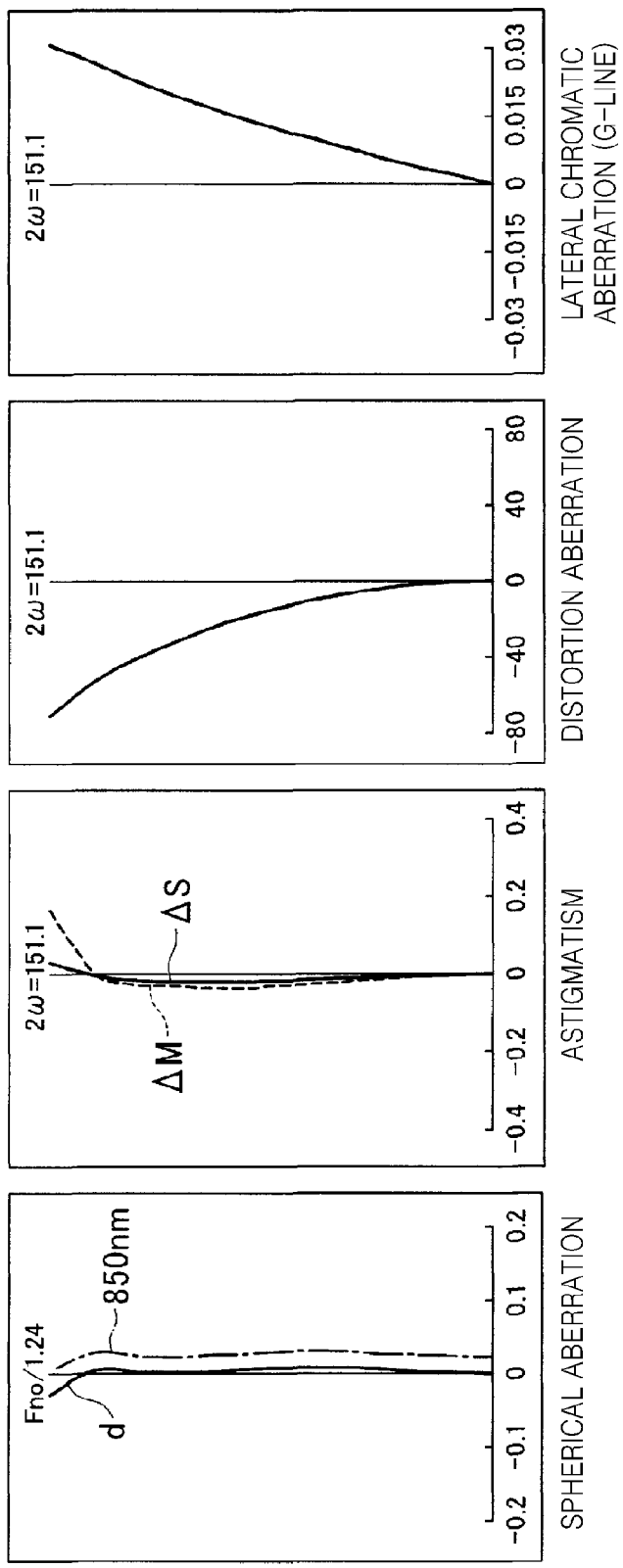
FIG. 15 illustrates charts of aberration showing spherical aberration, astigmatism, distortion aberration, and lateral chromatic aberration in a wide mode of the zoom lens of FIG. 14, respectively, according to an exemplary embodiment.
Figure 16:
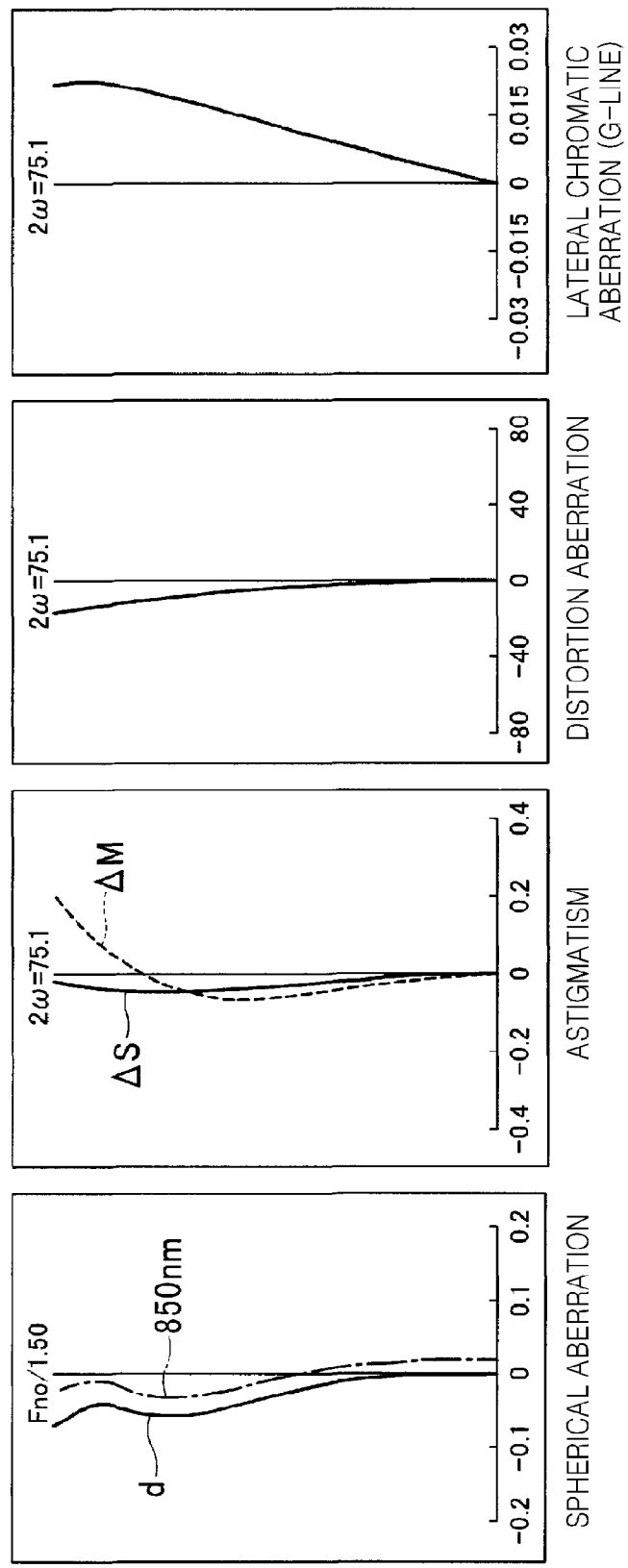
FIG. 16 illustrates charts of aberration showing spherical aberration, astigmatism, distortion aberration, and lateral chromatic aberration in a normal mode of the zoom lens of FIG. 14, respectively, according to an exemplary embodiment.
Figure 17:
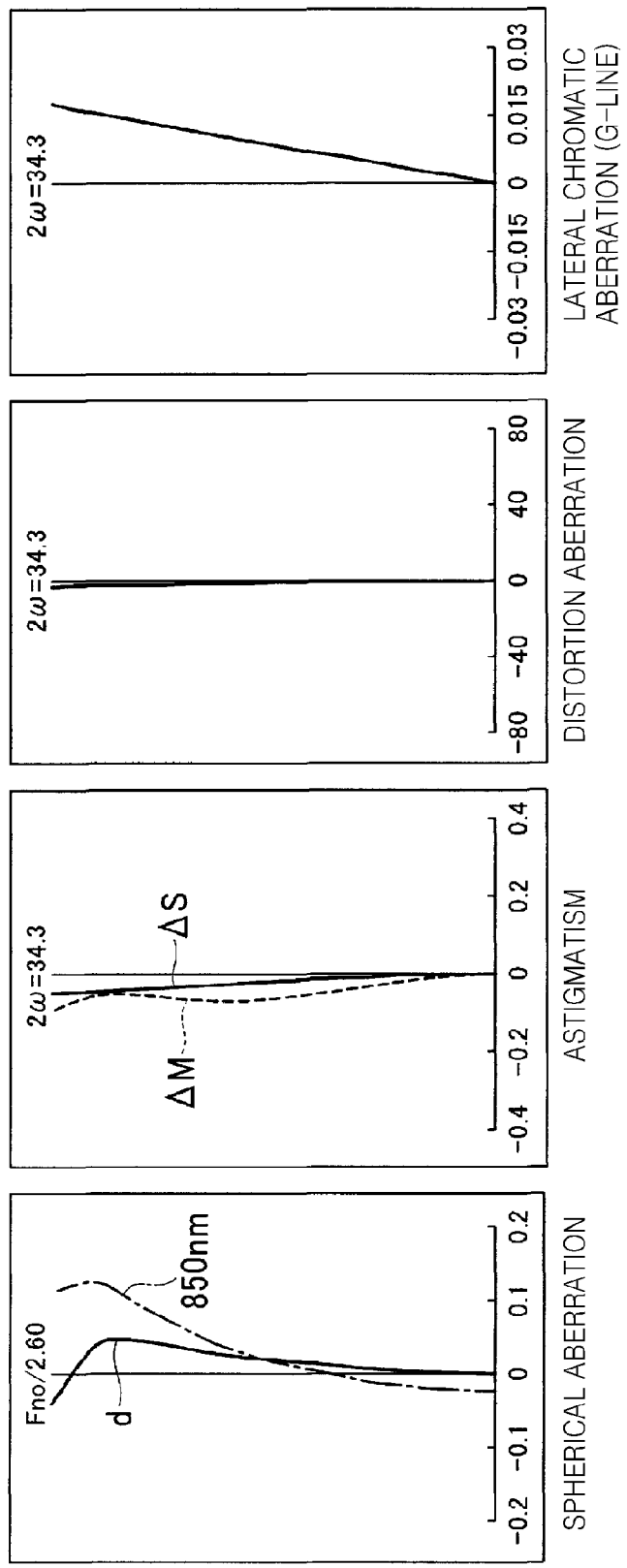
FIG. 17 illustrates charts of aberration showing spherical aberration, astigmatism, distortion aberration, and lateral chromatic aberration in a tele mode of the zoom lens of FIG. 15, respectively, according to an exemplary embodiment.

Spherical aberration, astigmatism, distortion aberration, and chromatic difference of magnification of the zoom lens having the above structure according to the fourth exemplary embodiment are shown in FIGS. 15, 16, and 17. An indication method of FIGS. 15, 16, and 17 is the same as that of FIGS. 3 through 5.

The zoom lens of the fourth exemplary embodiment satisfies conditions as illustrated in Tables 13 through 16. The zoom lens of the fourth embodiment may properly correct each of the aforementioned aberration, as illustrated in FIGS. 15, 16, and 17.

Exemplary Embodiment 5

Figure 18:
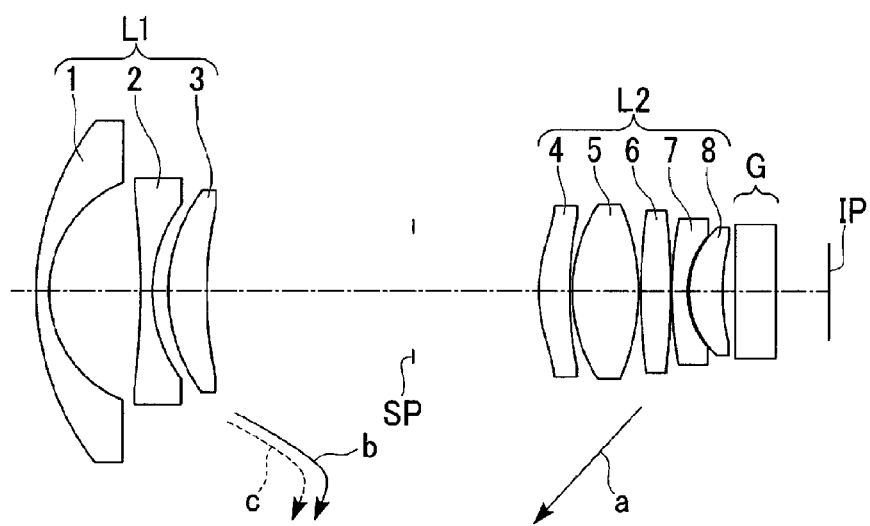
FIG. 18 is a cross-sectional view of a zoom lens according to another exemplary embodiment.

A structure of a zoom lens based on design data of a fifth exemplary embodiment is shown in FIG. 18. The zoom lens of FIG. 18 includes the second lens group L2 including five lens 4-8, and the following tables 17 through 20 show the design data of the zoom lens of the fifth exemplary embodiment. An indication method of tables 17 through 20 is the same as that of tables 1 through 4.

TABLE 17

| Number of surface (i) | Lens (GjRk) | Radius of curvature (R) | Thickness or distance (D) | Refractive index (Nd) | Abbe's number (Vd) |
|---|---|---|---|---|---|
| 1 | G1R1 | 18.081 | 0.850 | 1.83400 | 37.35 |
| 2 | G1R2 | 7.780 | 6.100 | | |
| 3 | G2R1 | −71.036 | 0.800 | 1.77250 | 49.62 |
| 4 | G2R2 | 9.342 | 1.100 | | |
| 5 | G3R1 | 10.833 | 2.528 | 1.92286 | 20.88 |
| 6 | G3R2 | 24.179 | Variable 1 | | |
| 7 | Aperture | — | Variable 2 | | |
| 8 | G4R1 | 10.655 | 2.050 | 1.56330 | 64.07 |
| 9 | G4R2 | 24.589 | 0.150 | | |
| 10 | G5R1 | 10.668 | 4.397 | 1.49700 | 81.61 |
| 11 | G5R2 | −15.140 | 0.150 | | |
| 12 | G6R1 | 40.061 | 1.929 | 1.80610 | 33.27 |
| 13 | G6R2 | −66.498 | 0.150 | | |
| 14 | G7R1 | 25.050 | 1.000 | 1.92286 | 20.88 |
| 15 | G7R2 | 5.414 | 0.155 | | |
| 16 | G8R1 | 5.705E+00 | 2.198 | 1.80860 | 40.42 |
| 17 | GBR2 | 17.732E+01 | Variable 3 | | |
| 18 | Plane | 1.00E+18 | 2.780 | 1.51680 | 64.20 |
| 19 | Plane | 1.00E+18 | 3.399 | | |

TABLE 18

| | Wide mode | Normal mode | Tele mode |
|---|---|---|---|
| Focal length | 2.88 | 4.90 | 9.68 |
| F number | 1.26 | 1.53 | 2.43 |
| Variable 1 | 13.82 | 4.41 | 1.40 |
| Variable 2 | 8.40 | 6.22 | 1.05 |
| Variable 3 | 1.05 | 3.22 | 8.39 |

TABLE 19

| Expression | Exemplary Embodiment 5 |
|---|---|
| (1) $vd_{22}$ | 81.61 |
| (2) $R_{22a}/R_{22b}$ | −0.70 |
| (3) $\|f_2/f_1\|$ | 1.08 |
| (4) $f_w/f_2$ | 0.31 |
| (5) $vd_{13}$ | 20.88 |
| (6) $\beta_{t2}$ | −1.12 |
| (7) $\Sigma_d/f_t$ | 5.46 |
| (8) $D_w/f_2$ | 1.00 |

TABLE 20

| | Number of surface | | |
|---|---|---|---|
| | 8 | 9 | 15 |
| C | 0.09385 | 0.04067 | 0.05639 |
| K | 0 | 0 | 0 |
| $A_4$ | −3.3433E−04 | 3.6086E−05 | 3.6550E−04 |
| $A_6$ | −5.2936E−06 | −4.4521E−06 | 2.0757E−05 |
| $A_8$ | −8.4144E−08 | 0.0000E+00 | 9.4427E−08 |
| $A_{10}$ | 0.0000E+00 | 0.0000E+00 | 0.0000E+00 |

Figure 19:
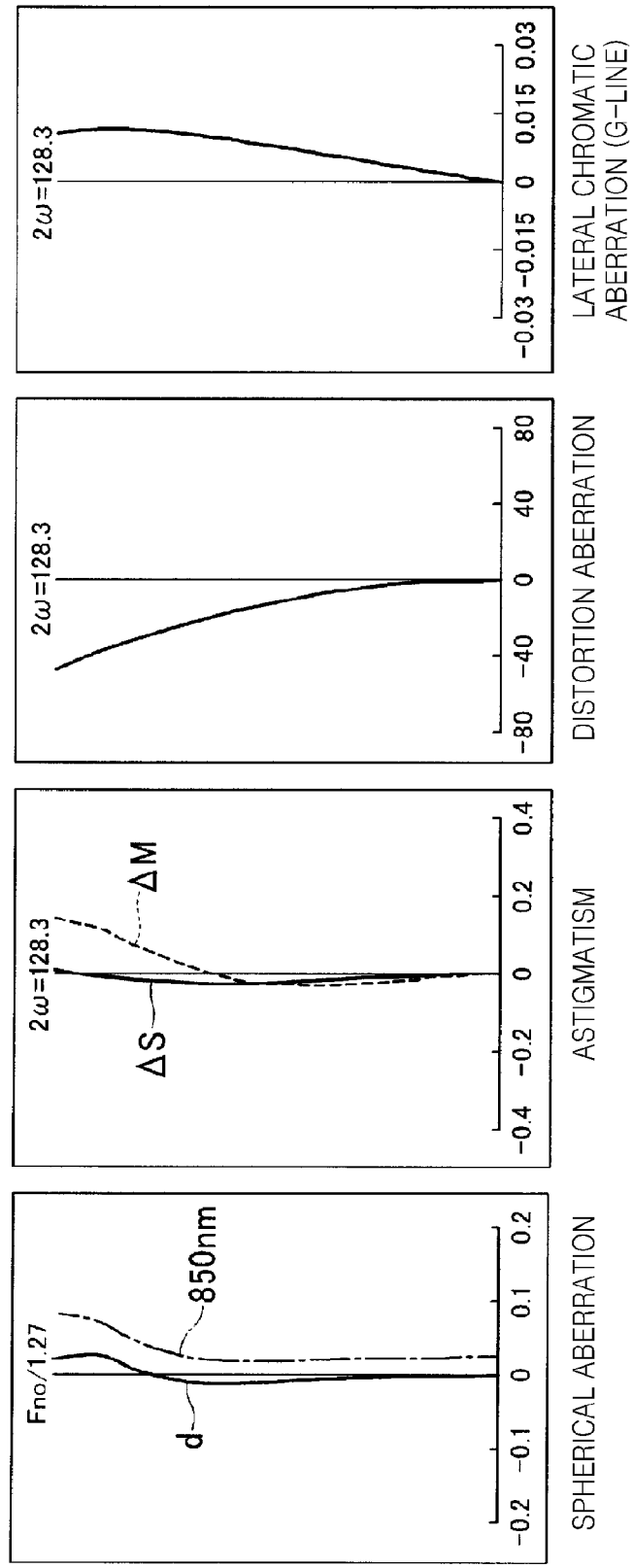
FIG. 19 illustrates charts of aberration showing spherical aberration, astigmatism, distortion aberration, and lateral chromatic aberration in a wide mode of the zoom lens of FIG. 18, respectively, according to an exemplary embodiment.
Figure 20:
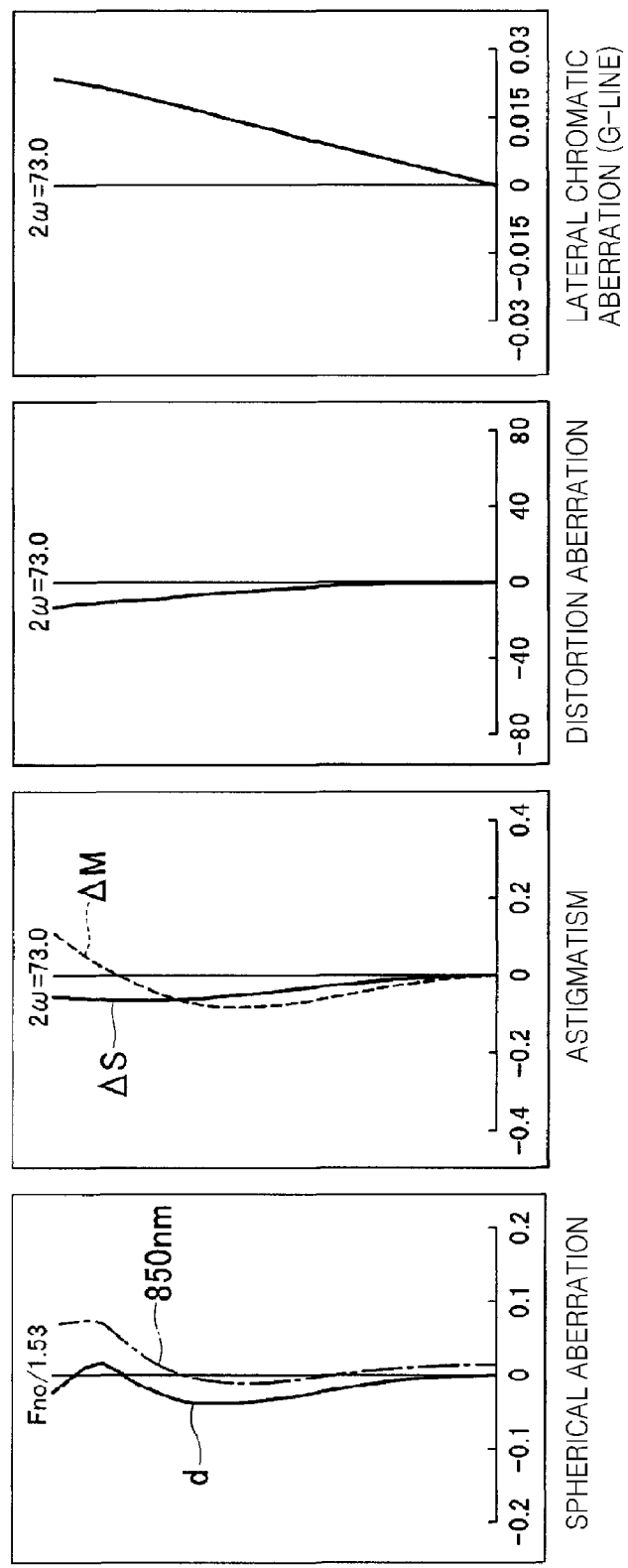
FIG. 20 illustrates charts of aberration showing spherical aberration, astigmatism, distortion aberration, and lateral chromatic aberration in a normal mode of the zoom lens of FIG. 18, respectively, according to an exemplary embodiment.
Figure 21:
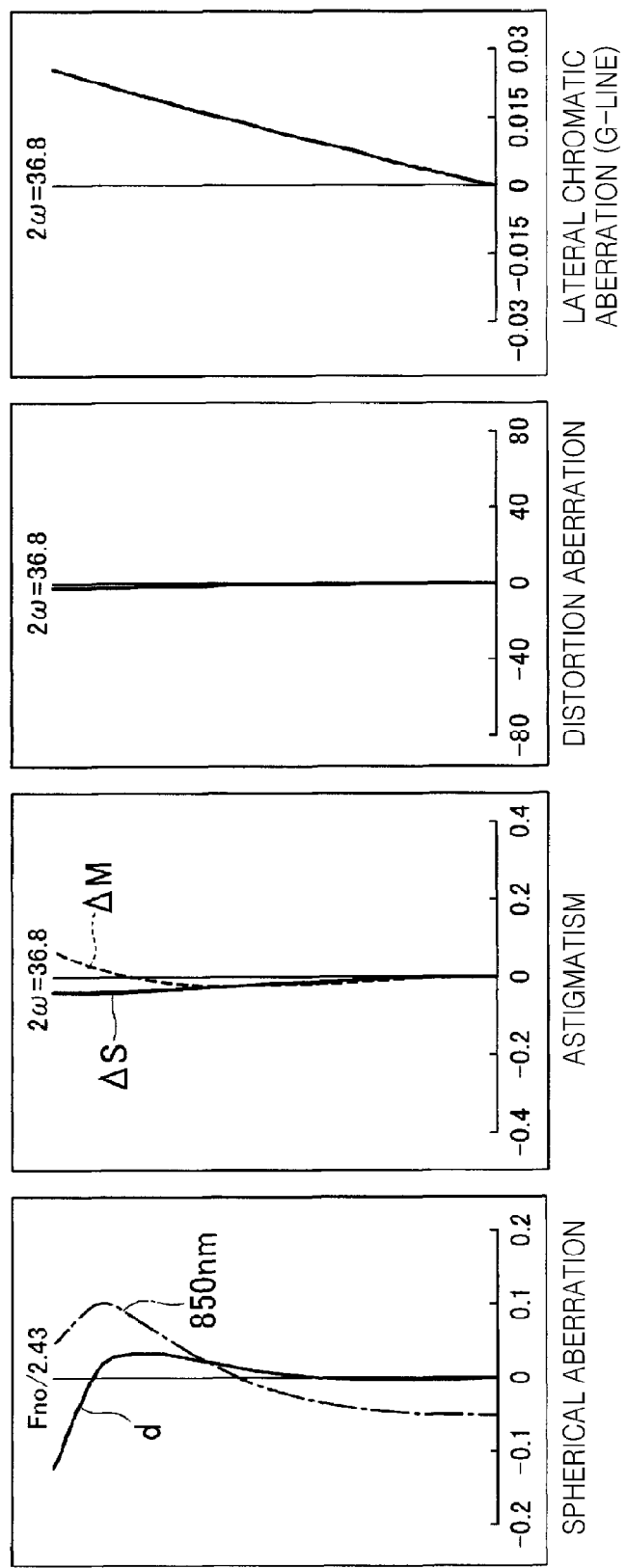
FIG. 21 illustrates charts of aberration showing spherical aberration, astigmatism, distortion aberration, and lateral chromatic aberration in a tele mode of the zoom lens of FIG. 18, respectively, according to an exemplary embodiment.

Spherical aberration, astigmatism, distortion aberration, and chromatic difference of magnification of the zoom lens having the above structure according to the fifth exemplary embodiment are shown in FIGS. 19, 20, and 21. An indication method of FIGS. 19, 20, and 21 is the same as that of FIGS. 3 through 5.

The zoom lens of the fifth exemplary embodiment satisfies conditions as shown in Tables 17 through 20. The zoom lens of the fifth embodiment may properly correct each of the aforementioned aberration, as illustrated in FIGS. 19, 20, and 21.

As described above, according to the exemplary embodiments, a small-sized zoom lens having a large aperture and having a high optical performance from a visible light region to a near infrared light region, and a photographing apparatus including the zoom lens can be provided.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims.

What is claimed is:

1. A zoom lens comprising, in an order from an object side to an image side:
   a first lens group having a negative refractive power;
   a second lens group having a positive refractive power; and
   an aperture disposed between the first lens group and the second lens group,
   wherein zooming is performed by varying a distance between the first lens group and the second lens group,
   wherein the second lens group comprises at least four lenses,
   wherein at least one lens surface of a lens that is disposed closest to the object side among the lenses of the second lens group is an aspherical surface,
   wherein at least one lens surface of a lens that is disposed closest to the image side among the lenses of the second lens group is an aspherical surface,
   wherein an object-side surface of a lens that is disposed third closest to the object side among the lenses of the second lens group is a convex surface,
   wherein a lens that is disposed second closest to the object side among the lenses of the second lens group satisfies the following expressions:

$$65 < vd_{22}$$

$$R_{22a}/R_{22b} < 0,$$

where $vd_{22}$ is an Abbe's number of the lens that is disposed second closest to the object side among the lenses of the second lens group, $R_{22a}$ is a curvature radius of a lens surface on the object side of the lens that is disposed second closest to the object side among the lenses, and $R_{22b}$ is a curvature radius of a lens surface on the image side of the lens that is disposed second closest to the object side among the lenses, and wherein a lens that is disposed closest to the image side among lenses of the first lens group has a positive refractive power, and the zoom lens satisfies the following expression:

$25 > Vd_{13}$ where $vd_{13}$ is an Abbe's number of the lens that is disposed closest to the image side among the lenses of the first lens group.

2. The zoom lens of claim 1, wherein the first lens group and the second lens group satisfy the following expression:

$1.0 < |f_2/f_1| < 1.5$, where $f_1$ is a combined focal length of the first lens group, and $f_2$ is a combined focal length of the second lens group.

3. The zoom lens of claim 1, wherein the first lens group and the second lens group satisfy the following expression:

$1.05 < |f_2/f_1| < 1.3$, where $f_1$ is a combined focal length of the first lens group, and $f_2$ is a combined focal length of the second lens group.

4. The zoom lens of claim 1, wherein the zoom lens satisfies the following expression:

$0.2 < f_w/f_2 < 0.4$, where $f_w$ is a focal length of the zoom lens in a wide mode, and $f_2$ is a combined focal length of the second lens group.

5. The zoom lens of claim 1, wherein the zoom lens satisfies the following expression:

$0.25 < f_w/f_2 < 0.35$, where $f_w$ is a focal length of the zoom lens in a wide mode, and $f_2$ is a combined focal length of the second lens group.

6. The zoom lens of claim 1, wherein the second lens group satisfies the following expression:

$-1.5 < \beta_{t2} < -1.0$ where $\beta_{t2}$ is a near-axis imaging magnification of the second lens group in a tele mode.

7. The zoom lens of claim 1, wherein the zoom lens satisfies the following expression:

$4.0 < \Sigma_d/f_t < 6.5$ where $\Sigma_d$ is a length of an optical axis from a vertex of the object side of the lens disposed closest to the object side among lenses of the first lens group to an image plane, and $f_t$ is a focal length of the zoom lens in a tele mode.

8. The zoom lens of claim 1, wherein the aperture between the first lens group and the second lens group is not moved during zooming, and the zoom lens satisfies the following expression:

$0.8 < D_w/f_2 < 1.3$ where $D_w$ is a distance from the aperture to a first principal point of the second lens group in a wide mode, and $f_2$ is a combined focal length of the second lens group.

9. The zoom lens of claim 1, further comprising an optical block disposed between the second lens group and an image plane.

10. The zoom lens of claim 9, wherein the optical block is one of an optical filter and a faceplate.

11. The zoom lens of claim 1, wherein the varying the distance between the first lens group and the second lens group for the zooming is performed by moving the second lens group among the first and second lens groups, and wherein, during the moving of the second lens group for the zooming, the first lens group is configured to move in a given direction to perform focusing and correcting a variation in an image plane caused by the zooming.

12. The zoom lens of claim 11, wherein the moving the second lens group for the zooming is performed on a linear moving path, and wherein the moving the first lens group in the given direction is performed on a moving path which is convex toward the image plane.

13. The zoom lens of claim 11, wherein moving the second lens group for the zooming is performed from a wide mode to a tele mode, and wherein the first lens group is configured to move in the given direction to perform the focusing and the correcting the variation in the image plane caused by the zooming when focusing is set on an object at infinity or on a near object, during the moving of the second lens group for the zooming.

14. The zoom lens of claim 1, wherein, the lens that is disposed closest to the object side among the lenses of the second lens group comprises two aspherical surfaces, wherein, in the lens that is disposed closest to the image side among the lenses of the second lens group, the aspherical surface is a surface facing the image side, and wherein, in the lens that is disposed third closest to the object side among the lenses of the second lens group, the convex surface is a surface facing the object side.

15. A photographing apparatus comprising:

the zoom lens of claim 1; and a solid state imaging device for capturing an image formed by the zoom lens.

* * * * *